United States Patent
Sawai

(10) Patent No.: US 8,693,791 B2
(45) Date of Patent: Apr. 8, 2014

(54) OBJECT DETECTION APPARATUS AND OBJECT DETECTION METHOD

(75) Inventor: Shogo Sawai, Tokyo (JP)

(73) Assignee: Morpho, Inc., Tokyo (JP)

( * ) Notice: Subject to any disclaimer, the term of this patent is extended or adjusted under 35 U.S.C. 154(b) by 861 days.

(21) Appl. No.: 12/742,869

(22) PCT Filed: Feb. 1, 2010

(86) PCT No.: PCT/JP2010/051355
§ 371 (c)(1),
(2), (4) Date: May 13, 2010

(87) PCT Pub. No.: WO2011/092865
PCT Pub. Date: Aug. 4, 2011

(65) Prior Publication Data
US 2012/0020514 A1 Jan. 26, 2012

(51) Int. Cl.
*G06K 9/68* (2006.01)
*G06K 9/00* (2006.01)
*H04N 7/18* (2006.01)

(52) U.S. Cl.
USPC ............ 382/226; 382/103; 382/118; 348/152

(58) Field of Classification Search
USPC ................... 382/224, 226, 103, 118; 348/152
See application file for complete search history.

(56) References Cited

U.S. PATENT DOCUMENTS

| | | | |
|---|---|---|---|
| 7,099,510 B2 * | 8/2006 | Jones et al. | 382/225 |
| 2005/0249401 A1 * | 11/2005 | Bahlmann et al. | 382/159 |
| 2006/0204103 A1 | 9/2006 | Mita et al. | |
| 2009/0087038 A1 | 4/2009 | Okada et al. | |
| 2009/0116693 A1 * | 5/2009 | Yamamoto et al. | 382/103 |
| 2009/0157707 A1 * | 6/2009 | Ito et al. | 707/100 |

FOREIGN PATENT DOCUMENTS

| | | |
|---|---|---|
| JP | 2006-268825 A | 10/2006 |
| JP | 2006-350645 A | 12/2006 |
| JP | 2009-087209 A | 4/2009 |
| JP | 2009-116401 A | 5/2009 |
| JP | 2009-151395 A | 7/2009 |
| JP | 2009-301367 A | 12/2009 |
| WO | 2008/026414 A1 | 3/2008 |

OTHER PUBLICATIONS

International Preliminary Report on Patentability issued in International Application No. PCT/JP2010/051355 dated Sep. 27, 2012.

* cited by examiner

*Primary Examiner* — Kathleen Y Dulaney
(74) *Attorney, Agent, or Firm* — Sughrue Mion, PLLC

(57) ABSTRACT

An object detection apparatus that detects an object to be detected captured in a determination image according to a feature amount of the object to be detected preliminarily learned by the use of a learning image, the object detection apparatus including a detector causing strong classifiers to operate in order of lower classification accuracy, continuing processing when the strong classifier has determined that the object to be detected is captured in the determination image, and determining that the object to be detected has not been detected without causing the strong classifier having classification accuracy higher than the aforementioned strong classifier to operate, when the strong classifier has determined that the object to be detected is not captured in the determination image, wherein the strong classifier inputs a classification result of the strong classifier having classification accuracy lower than the aforementioned strong classifier and determines whether the object to be detected is captured or not in the determination image according to the plurality of estimation values and the input classification result.

6 Claims, 8 Drawing Sheets

OBJECT DETECTION APPARATUS AND OBJECT DETECTION METHOD

TECHNICAL FIELD

The present invention relates to an object detection apparatus and an object detection method.

BACKGROUND ART

Conventionally, there are known an apparatus and a method for detecting an object on the basis of image information as an apparatus and a method for detecting an object, respectively (e.g., refer to Patent document 1). The detection apparatus according to Patent document 1 learns information (e.g., feature amount) about an object to be detected (e.g., face) included in the image information, and configures plural homogeneous classifiers according to the learning result. The plural homogeneous classifiers are configured so as to have different degrees of detection accuracy for the object to be detected by the change of the number of the feature amounts, for example. The apparatus according to Patent document 1 configures one detector by connecting the plural homogeneous classifiers in cascade so as to gradually provide higher detection accuracy of each of the homogeneous classifiers toward the end of the processing. The apparatus according to Patent document 1 inputs the image information of an image to be determined into the detector and causes the homogeneous classifiers configuring the detector to operate in the cascade order, and then determines that the object to be detected has been detected from the determination image information only when all the homogeneous classifiers have detected the object to be detected. Here, when one of the plural homogeneous classifiers configuring the detector has determined that the determination image information does not include the feature amount of the object to be detected, the apparatus according to Patent document 1 does not perform the processing to be performed after the processing in the homogeneous classifiers and determines that the object to be detected is not detected from the determination image information.

PRIOR ART DOCUMENT

Patent Document

Patent document 1: U.S. Pat. No. 7,099,510

DISCLOSURE OF THE INVENTION

Problem to be Solved by the Invention

However, in the apparatus according to Patent document 1, since the homogeneous classifier configuring the detector is configured to gradually provide higher accuracy toward the end of the cascade connection, the number of the feature amounts to be determined by the homogeneous classifier tends to increase toward the end of the detection processing. That is, there is a possibility that the processing speed of the individual homogeneous classifier is reduced more in the latter stage of the cascade connection. Therefore, in the apparatus according to Patent document 1, the object detection speed sometimes decreases.

Accordingly, the present invention has been achieved for solving such a technical problem and aims for providing an object detection apparatus and an object detection method, capable of achieving higher speed object detection processing.

Means for Solving the Problem

That is, an object detection apparatus of an aspect of the present invention is one that detects an object to be detected captured in a determination image according to a feature amount of the object to be detected preliminarily learned by the use of a learning image, wherein the object detection apparatus includes: a plurality of weak classifiers each calculating an estimation value indicating a possibility that the object to be detected is captured in the determination image according to the feature amount of the object to be detected; a plurality of strong classifiers determining, with different levels of classification accuracy from one another, whether the object to be detected is captured or not in the determination image according to the plurality of feature amounts; and a detector causing the strong classifiers to operate in order of lower classification accuracy, continuing processing when the strong classifier has determined that the object to be detected is captured in the determination image, and determining that the object to be detected has not been detected without causing the strong classifier having classification accuracy higher than the aforementioned strong classifier to operate, when the strong classifier has determined that the object to be detected is not captured in the determination image, wherein the strong classifier inputs a classification result of the strong classifier having classification accuracy lower than the aforementioned strong classifier and determines whether the object to be detected is captured or not in the determination image according to the plurality of estimation values and the input classification result.

According to the object detection apparatus of an aspect of the present invention, the strong classifier configuring the detector inputs the classification result of the strong classifier having lower classification accuracy than the aforementioned strong classifier, and determines whether or not the object to be detected is captured in the determination image by the use of the input classification result. That is, in this object detection apparatus, each of the strong classifiers does not determine the object to be detected independently, but each of the strong classifiers determines the object to be detected by utilizing the classification result of another strong classifier. In this manner, by the strong classifier utilizing the classification result of another strong classifier, it is possible to reduce the number of the estimation values of the weak classifiers used for the calculation in each of the strong classifiers, compared to a case where each of the strong classifiers determines the object to be detected independently. Accordingly, even when the detection accuracy of the strong classifier configuring the detector is configured to gradually become higher toward the end of the in-line connection, it becomes possible to increase the processing speed in each of the strong classifiers. Thereby, it is possible to make a high speed determination whether the object to be detected is captured or not in the determination image, as a result.

Here, the strong classifier may input the classification result of the strong classifier having lower classification accuracy next to the aforementioned strong classifier among the plurality of strong classifiers.

Further, the strong classifier may determine whether the object to be detected is captured or not in the determination image according to a result of weighted voting by using a weight indicating a degree of ease of identification of the weak classifier and the estimation value of the weak classifier, and according to the input classification result.

Still further, the strong classifier may input the result of the weighted voting by using the weight indicating the degree of ease of identification of the weak classifier and the estimation value of the weak classifier, as the classification result of the strong classifier having lower classification accuracy than the aforementioned strong classifier.

Moreover, each of the plurality of strong classifiers is provided with a weight according to the classification accuracy, and the strong classifier may multiply the input result of the weighted voting by the weight of the strong classifier on the input side and determine whether the object to be detected is captured or not in the determination image using the multiplied value. In such a configuration, the degree of reflecting the classification result of another strong classifier is changed according to the weight of the strong classifier on the input side. Accordingly, it is possible to reflect the classification result of another strong classifier appropriately to the own classification, and thereby it becomes possible to increase the classification accuracy of the individual strong classifier.

Furthermore, an object detection method of an aspect of the present invention is that of an object detection apparatus which is provided with a plurality of weak classifiers each calculating respective an estimation value indicating a possibility that an object to be detected is captured in a determination image according to a feature value of the object to be detected and a plurality of strong classifiers determining, with different levels of classification accuracy from one another, whether the object to be detected is captured or not in the determination image according to the plurality of estimation values, the object detection method including: a carrying-out step of causing the plurality of strong classifiers, which are connected in series in order of lower classification accuracy, to carry out classification in the order of lower classification accuracy; and a classification step of causing the strong classifier to input a classification result of the strong classifier having classification accuracy lower than the aforementioned strong classifier and to determine whether the object to be detected is captured or not in the determination image according to the plurality of estimation values and the input classification result, wherein the carrying-out step is continued when the strong classifier has determined that the object to be detected is captured in the determination image in the classification step, and the carrying-out step is interrupted when the strong classifier has determined that the object to be detected is not captured in the determination image.

In the classification step, the strong classifier may input the classification result of the strong classifier having lower classification accuracy next to the aforementioned strong classifier among the plurality of strong classifiers.

Further, in the classification step, the strong classifier may determine whether the object to be detected is captured or not in the determination image according to a result of weighted voting by using a weight indicating the degree of ease of identification of the weak classifier and the estimation value of the weak classifier, and according to the input classification result.

Still further, in the classification step, the strong classifier may input the result of the weighted voting by using a weight indicating the degree of ease of identification of the weak classifier and the estimation value of the weak classifier, as the classification result of the strong classifier having lower classification accuracy than the aforementioned strong classifier.

Moreover, each of the plurality of strong classifiers is provided with a weight according to the classification accuracy, and, in the classification step, the strong classifier may multiply the input result of the weighted voting by the weight of the strong classifier on the input side and determine whether the object to be detected is captured or not in the determination image by using the multiplied value.

The object detection method of an aspect of the present invention provides the same effect as the above described object detection apparatus of an aspect of the present invention.

Advantage of the Invention

According to the object detection apparatus or the object detection method of an aspect of the present invention, it is possible to achieve a high speed in the object detection processing.

DESCRIPTION OF THE EMBODIMENT(S)

Hereinafter, an embodiment of the present invention will be explained with reference to the accompanying drawings. Note that the same or corresponding part is denoted by the same symbol in each of the drawings and repeated explanation will be omitted.

An object detection apparatus according to the present embodiment is an apparatus detecting (determining or identifying) an object captured in an image according to image information, and is employed preferably in a personal computer, a digital camera, a mobile phone, PDA (Personal Digital Assistant), or the like. The object detection apparatus according to the present embodiment learns a feature of an object to be detected before detection processing and performs the detection processing according to the learned feature. While the object to be detected is not particularly limited, the face of a person, for example, is used for the object to be detected. Note that, in the following, a face detection apparatus to be mounted on a mobile terminal provided with a camera function will be explained as an example of the object detection apparatus according to the present invention in consideration of the ease of explanation and understanding.

Figure 1:
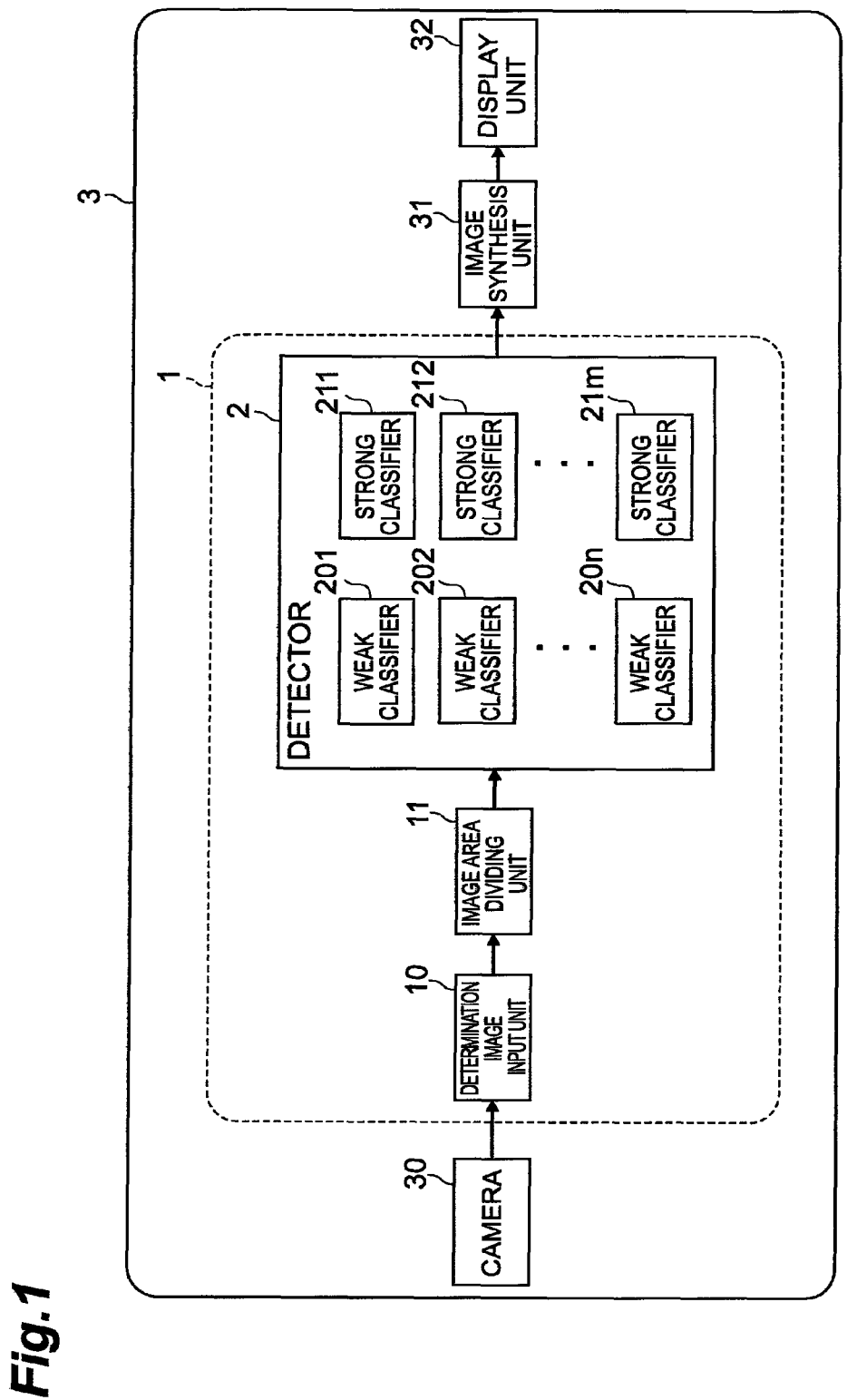
FIG. 1 is a functional block diagram of a mobile terminal equipped with an object detection apparatus of an aspect of the present invention.
Figure 2:
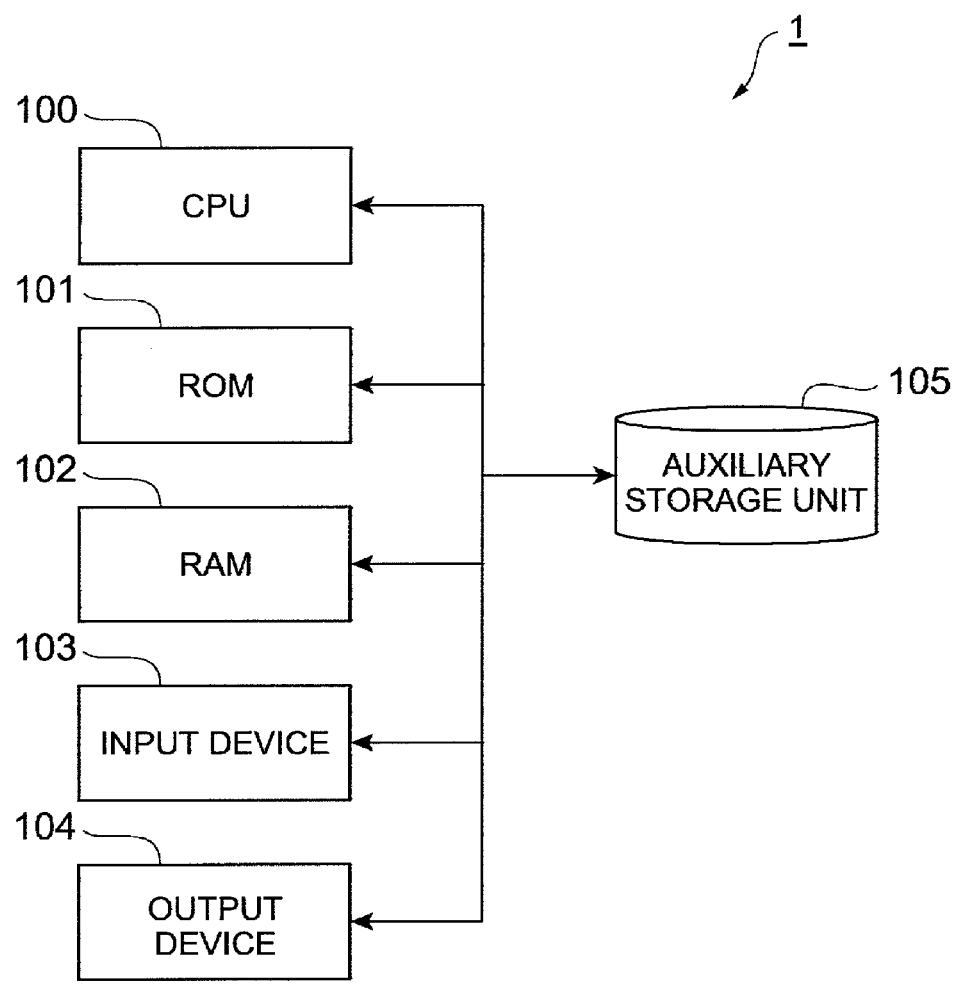
FIG. 2 is a hardware configuration diagram of a mobile terminal equipped with an object detection apparatus of an aspect of the present invention.

FIG. 1 is a functional block diagram of a mobile terminal 3 equipped with a face detection apparatus 1 according to the present embodiment. The mobile terminal 3 shown in FIG. 1 is a movable terminal carried by a user, for example. First, a hardware configuration of the mobile terminal 3 will be explained. FIG. 2 shows a hardware configuration of the mobile terminal 3. As shown in FIG. 2, the mobile terminal 3 is physically configured as a typical computer system including a CPU (Central Processing Unit) 100, main memory units such as ROM (Read Only Memory) 101 and a RAM (Random Access Memory) 102, an input device 103 such as a camera or a keyboard, an output device 104 such as a display, an auxiliary memory unit 105 such as a hard disk, etc. Each function to be described hereinafter of the mobile terminal 3 and the face detection apparatus 1 is realized by the following operations: causing the hardware such as the CPU 100, the ROM 101, and the RAM 102 to read predetermined computer software onto the hardware such as the CPU 100, the ROM 101, and the RAM 102; thereby operating the input device 103 and the output device 104 under the control of the CPU 100; and also carrying out data read-out and write-in in the main memory units and the auxiliary memory unit 105. Note that, while the above configuration is explained as the hardware configuration of the mobile terminal 3, the face detection apparatus 1 also may be configured as a typical computer system including the CPU 100, the main memory units such as the ROM 101 and the RAM 102, the input device 103, the output device 104, the auxiliary memory unit 105, etc. Further, the mobile terminal 3 may be provided with a communication module or the like.

As shown in FIG. 1, the mobile terminal 3 is provided with a camera 30, a face detection apparatus 1, an image synthesis unit 31, and a display unit 32. The camera 30 has a function of capturing an image. An imaging element or the like is used for the camera 30, for example. The camera 30 has a function of outputting a captured image to the face detection apparatus 1 as a determination image. The image synthesis unit 31 has a function of generating a synthesis image in which the determination image is overlapped with a symbol or an enclosure for emphasizing a face part of the determination image, according to a detection result of the face detection apparatus 1. The display unit 32 has a function of displaying the synthesis image generated by the image synthesis unit 31.

The face detection apparatus 1 is provided with a determination image input unit 10, an image area dividing unit 11 and a detector 2. The determination image input unit 10 has a function of inputting the image captured by the camera 30 as the determination image.

The image area dividing unit 11 has a function of dividing the determination image input by the determination image input unit 10 into predetermined areas. The image area dividing unit 11 has a function of dividing an image area of the determination image into a plurality of small areas (so called sub-window) each having a predetermined size. This sub-window may have a rectangular shape or any other shape. The sub-windows can be positioned so as to be overlapped or so as not to be overlapped with one another. Further, the image area dividing unit 11 can change the magnification of this sub-window into various sizes. Therefore, it is possible to change a range to be processed in the object image. For the method of the magnification change, it is possible to employ a conventional method.

Figure 3:
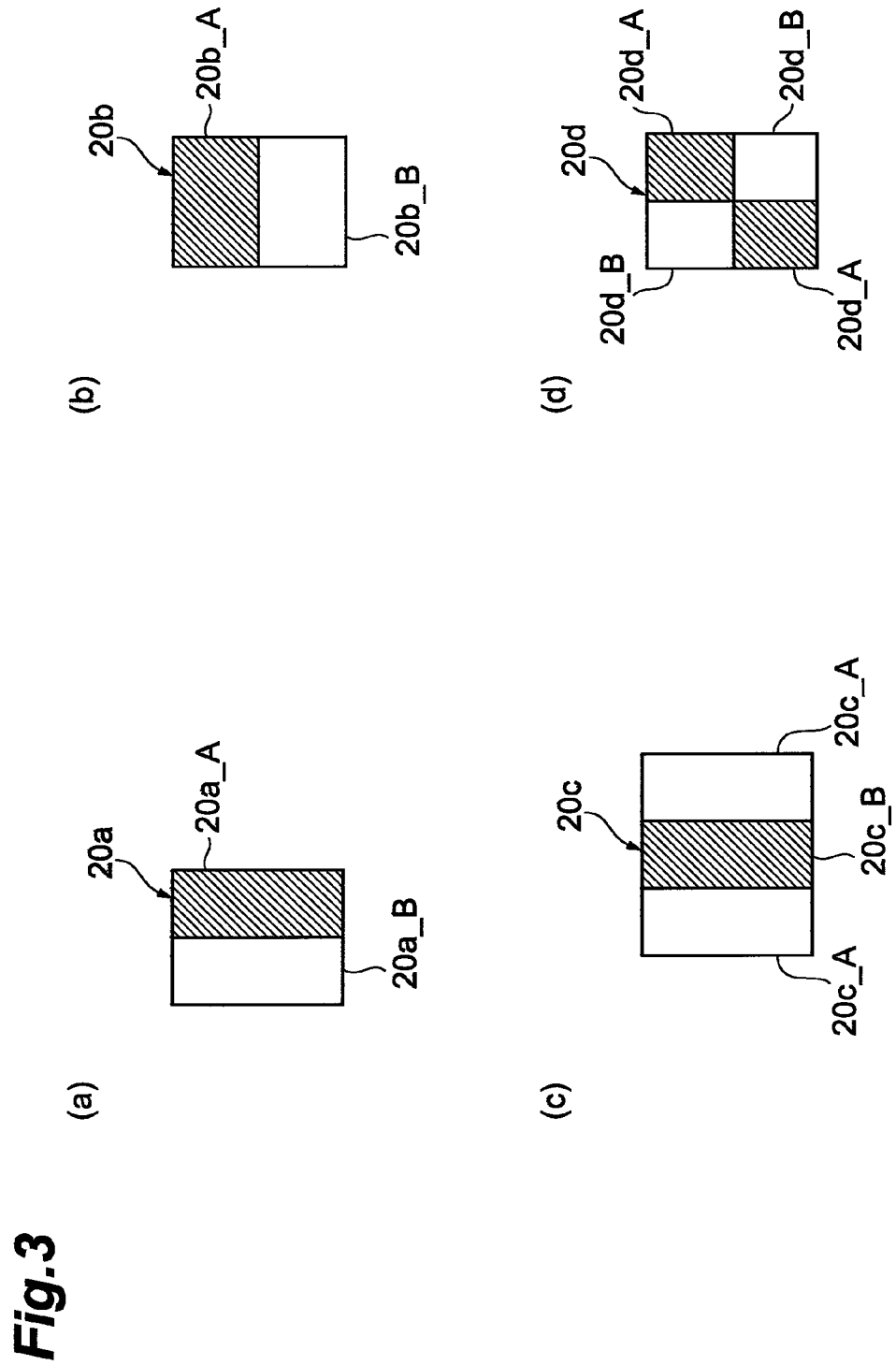
FIG. 3 shows an example of a feature amount used by an object detection apparatus of an aspect of the present invention.
Figure 4:
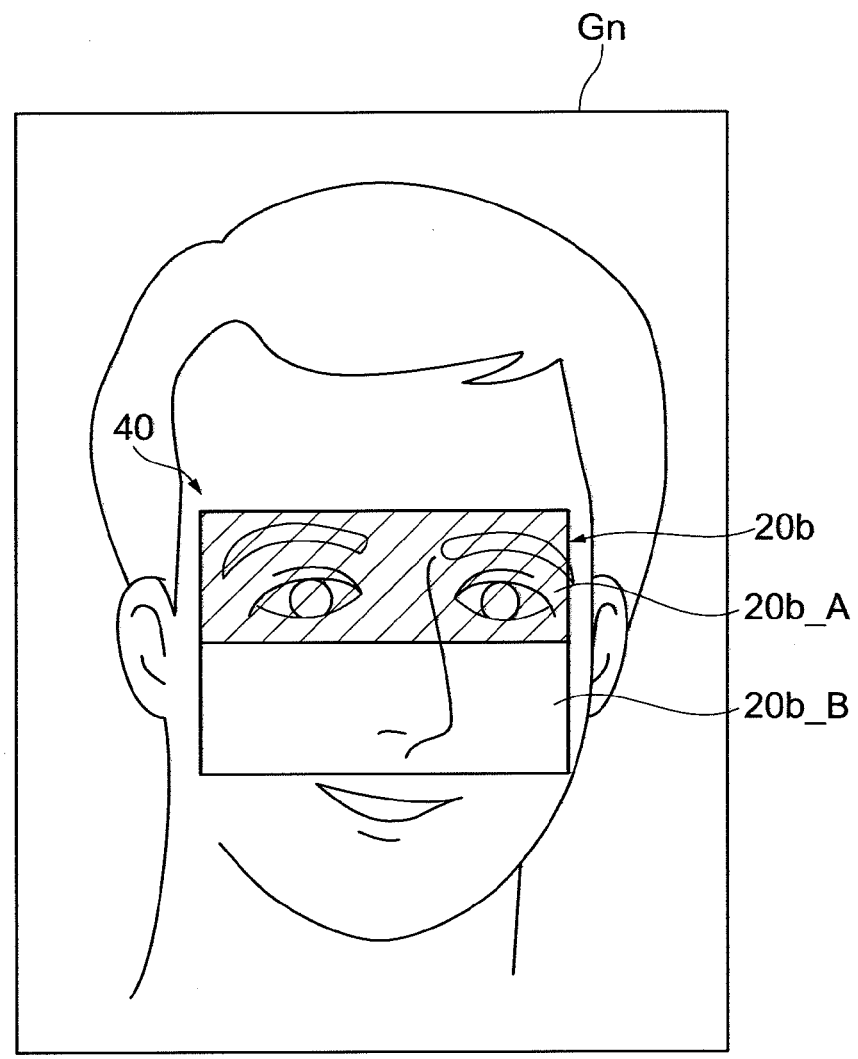
FIG. 4 shows an example of applying one of the feature amounts shown in FIG. 3 to an image.

The detector 2 has a function of inputting the sub-window divided by the image area dividing unit 11 and determining whether a face of the object to be detected is captured or not in the sub-window. That is, the detector 2 has a function of detecting a face displayed in the input sub-window. The detector 2 determines whether the face is captured or not according to image information of the sub-window (brightness value or the like) and rectangle features. The rectangle feature is a kind of local feature and the Haar-like feature is used for the rectangle feature, for example. FIG. 3 shows examples of the rectangle feature. FIGS. 3(*a*) to 3(*d*) show the four kinds of rectangle features 20*a* to 20*d*, respectively. The rectangle features 20*a* and 20*b* shown in FIGS. 3(*a*) to 3(*d*), respectively, are the features for extracting a feature appearing at an edge part of the face, and the rectangle features 20*c* and 20*d* shown in FIGS. 3(*c*) and 3(*d*), respectively, are the features for extracting a feature appearing at a line part of the face. Each of the rectangle features 20*a* to 20*d* is evaluated by a difference between the sub total of pixel values (brightness values) (or average brightness value) within a white area and the sum total of pixel values (or average brightness value) within a black area. For example, the rectangle feature 20*a* is evaluated by a difference between the sum total of the brightness values within the white area 20*a*_B and the sum total of the brightness values within the black area 20*a*_A. Each of the rectangle features 20*a* to 20*d* can be applied to any position within the sub-window. FIG. 4 shows an example of applying the rectangle feature 20*b* to the sub-window Gn. As shown in FIG. 4, when the sub-window Gn is provided to the detector 2, the detector 2 calculates a difference between the sum total of the brightness values within the white area 20*b*_B and the sum total of the brightness values within the black area 20*b*_A, of the rectangle feature 20*b*. In the face of a person 40, the black area 20*b* A surrounding an eye line is frequently darker than the white area 20*b*_B under the eye line surrounding a nose and a cheek. The detector 2 learns such a feature of a person's face preliminarily and determines a result by classification whether or not the calculated difference is larger than a preliminarily learned threshold value.

The detector 2 is provided with a plurality of weak classifiers 20*n* (n: integer) for performing such processing efficiently. The weak classifier 20*n* is a classifier having a relatively low classification ability and has a function of calculating an estimation value indicating a possibility that the preliminarily learned face feature is displayed within the sub-window. The plurality of weak classifiers 20*n* are prepared in correspondence to the respective rectangle features described above, and the weak classifier 20*n* is a threshold function for calculating a difference between the sum total of the brightness values in the white area and the sum total of the brightness values in the black area regarding the corresponding rectangle feature, and outputting the estimation value of 1 or 0 according a magnitude relationship between the difference and a threshold value. For example, the weak classifier 20*n* is represented by following Formula 1.

[Formula 1]

$$h_j = \begin{cases} 1, & \text{if } p_j f_j(x) > p_j T_j \\ 0, & \text{otherwise} \end{cases} \quad (1)$$

Here, x is the feature amount and $f_j(x)$ is the function of the weak classifier 20*n*. That is, f(x) is a function for calculating a difference between the sum total of the brightness values in the white area and the sum total of the brightness in the black area by using the rectangle feature corresponding to the feature amount x. $p_j \in \{-1, 1\}$ and the threshold value $T_j$ are constants which are determined preliminarily by mechanical learning for each of the weak classifiers 20*n*. When the difference f(x) is larger than the threshold value $T_j$ (i.e., when p=1), or when the difference f(x) is smaller than the threshold value $T_j$ (i.e., when p=−1), it is determined that the face is displayed in the sub-window.

The detector 2 builds the strong classifier 21m (m: integer) having comparatively high classification accuracy by combining the above weak classifiers 20n. The strong classifier 21m has a function of performing weighted voting according to the plurality of estimation values calculated by the respective plurality of weak classifiers 20n and weights provided to the respective weak classifiers 20n, and determining whether a face is displayed within the sub-window by using the result. The combination and the number of the weak classifiers used for the weighted voting are different depending on each of the strong classifiers 21m. Therefore, the strong classifiers 21m have different levels of classification accuracy from one another. The detector 2 determines one sub-window with the plurality of strong classifiers 21m and finally determines whether the face is included or not in the sub-window according to classification results of the plurality of strong classifiers 21m.

$p_j \in \{-1, 1\}$ and the threshold value $T_j$ of the weak classifier 20n, the weight of the weak classifier 20n, and the combination of the weak classifiers 20n used by the strong classifier 21m are preliminarily learned by the AdaBoost algorithm, for example. The AdaBoost algorithm is one of the mechanical learning methods and is an algorithm causing a combination of a plurality of simple classifiers to learn to thereby identify image information which is difficult to identify by a simple learning method. The basic simple classifier corresponds to the weak classifier 20n. Further, an eventual classifier in the AdaBoost algorithm is the strong classifier 21m.

The outline of the learning method in the AdaBoost algorithm will be explained. First, a group of face images capturing a face of an object to be detected, a group of face images without capturing the face of the object to be detected, and a group of the weak classifiers 20n are prepared. Then, $p_j$ and $T_j$ in each of all the weak classifiers 20n are determined temporarily using the group of the face images and the group of non-face images. A weight $k_j$ is prepared and initialized for each of the face images and the non-face images. This weight $k_j$ represents an importance in the classification and the image having a larger value of this weight $k_j$ is a more important image which is not allowed to be specified erroneously. Then, $p_j$ and $T_j$ of the weak classifier 20n are optimized to minimize a weighted error and the weak classifier 20n having the minimum weighted error is employed as the weak classifier 20n to be used by the strong classifier 21m from the group of the weak classifiers 20n. After that, the weights $k_j$ of the face image and the non-face image are updated. Such a weight $k_j$ is updated each time when one of the weak classifiers 20n is selected. For example, the updating is performed so as to increase the weight k of the learning image which cannot be identified well by the selected weak classifier 20n. Accordingly, the repetition of the above processing allows easy selection of the weak classifier 20n, which can identify the image difficult to be identified so far, further well. Then, a combination of the weak classifiers 20 which can identify all the learning images correctly is determined finally. Further, the strong classifier 21m is configured to perform the weighted voting by using the weight allotted to each of the weak classifiers 20n and the function $h_j$ of the weak classifier 20n. For example, the strong classifier represented by following Formula 2 is formed by AdaBoost learning.

[Formula 2]

$$S_0 = \sum_{j=0}^{N_0} w_j h_j(x) > \vartheta_0 \quad (2)$$

In Formula 2, the weak classifier 20n corresponds to $h_j(x)$ and the strong classifier 21m corresponds to $S_0$. The weight $w_j$ of the weak classifier 20n means a voting power and represents a degree of ease of identification (i.e., reliability) of the weak classifier 20n. This weight $w_j$ is calculated by the use of an error rate based on a weighting error in the learning. For example, the weight $w_j$ of the weak classifier 20n which determines almost all the correct face images to be the face is set to be larger. Further, the weight $w_j$ of the weak classifier 20n which does not determine almost all the correct face images to be the face is also set to be larger, because the determination may be only reversed. Meanwhile, $\theta_0$ is a value calculated according to the weight $w_j$ in the learning, and the image is determined to be the face when $S_0$ is larger than $\theta_0$. Here, the selection and addition of the weak classifier 20n is performed until $S_0$ allows A % or more of the face images for the learning to pass and also allows less than B % of the non-face image for the learning to pass. A and B can be set arbitrarily. By changing these A and B, it is possible to form the strong classifiers 21m having different classification accuracy values from one another.

After having generated $S_0$, $S_1$ of the strong classifier 21m having better classification accuracy is generated subsequently by the learning. In the learning of $S_1$, A and B are set to be severe compared to those in the learning of $S_0$ so as to allow $S_1$ to have better classification accuracy than $S_0$. Further, in the learning of $S_1$, the weak classifier 20n is selected and added in a state of inputting the classification result of $S_0$. By the repetition of this learning, the strong classifier $S_i$ (i: integer) shown in following Formula 3 is generated.

[Formula 3]

$$S_i = W_{i-1} S_{i-1} + \sum_{j=0}^{N_i} w_j h_j(x) > \vartheta_i \quad (3)$$

In this manner, the strong classifier 21m is configured to input the classification result of the strong classifier 21m having lower classification accuracy next to the aforementioned strong classifier 21m. Here, $W_i$ is a weight set for each of the strong classifiers $S_i$. For example, $W_i$ is set for each of the classification accuracy values of the strong classifiers 21m. Further, in the learning, by performing the selection and addition of the weak classifier 20n in a state of inputting the classification result of the strong classifier 21m having lower classification accuracy, it is possible to suppress the number of the weak classifiers to be selected and added compared to a case of forming the strong classifier 21m having higher classification accuracy by selecting the weak classifier 20n from scratch.

The detector 2 combines $S_0$ and $S_i$ of the generated strong classifiers 21m linearly for a in-line operation. Each of the linearly combined strong classifiers 21m is also referred to as a stage. At this time, each of the strong classifiers 21m is combined in an arrangement in which the classification accuracy become higher toward the end of the in-line connection. When the sub-window is input, the detector 2 causes the linearly connected strong classifiers 21m to operate sequentially. When the strong classifiers 21m has detected the face, the detector 2 causes the strong classifier 21m having the next higher classification accuracy to perform the detection processing, and when the strong classifier 21m has not detected the face, the detector 2 does not perform the subsequent processing which makes use of the strong classifier having classification accuracy higher than the aforementioned strong classifier 21m. Further, except the first stage, each of the strong classifiers 21m performs the own processing by inputting the classification result of the strong classifier 21m having lower classification accuracy next to the aforementioned strong classifier 21m.

Figure 5:
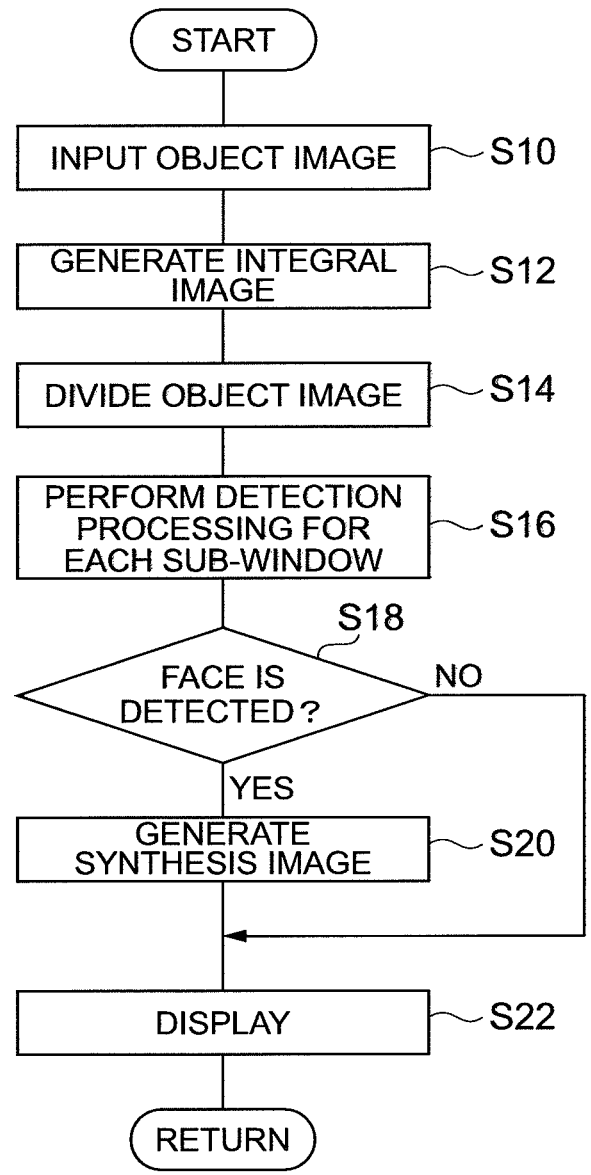
FIG. 5 is a flowchart explaining an operation in an object detection apparatus of an aspect of the present invention.

Next, an operation of the face detection apparatus will be explained. FIG. 5 is a flowchart showing the operation of the face detection apparatus 1. The processing shown in FIG. 5 is performed in the timing when the camera function of the mobile terminal 3 is turned on, for example, and is performed repeatedly with a predetermined period. Note that the processing of S10 to S16 shown in FIG. 5 is performed by the face detection apparatus 1, and the processing of S18 to S22 is performed by the mobile terminal 3.

Figure 6:
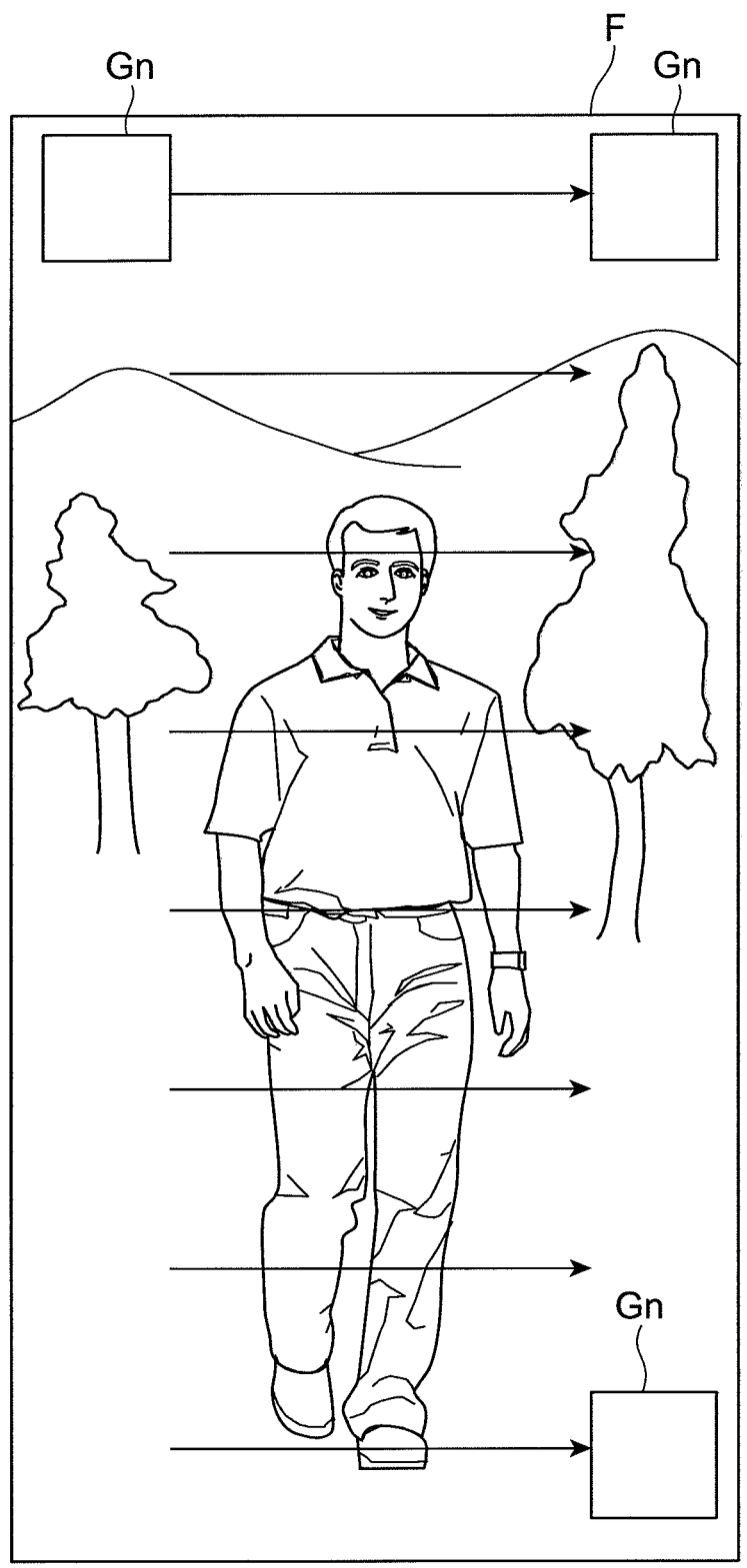
FIG. 6 is an outline diagram explaining the division of an image to be specified.
Figure 7:
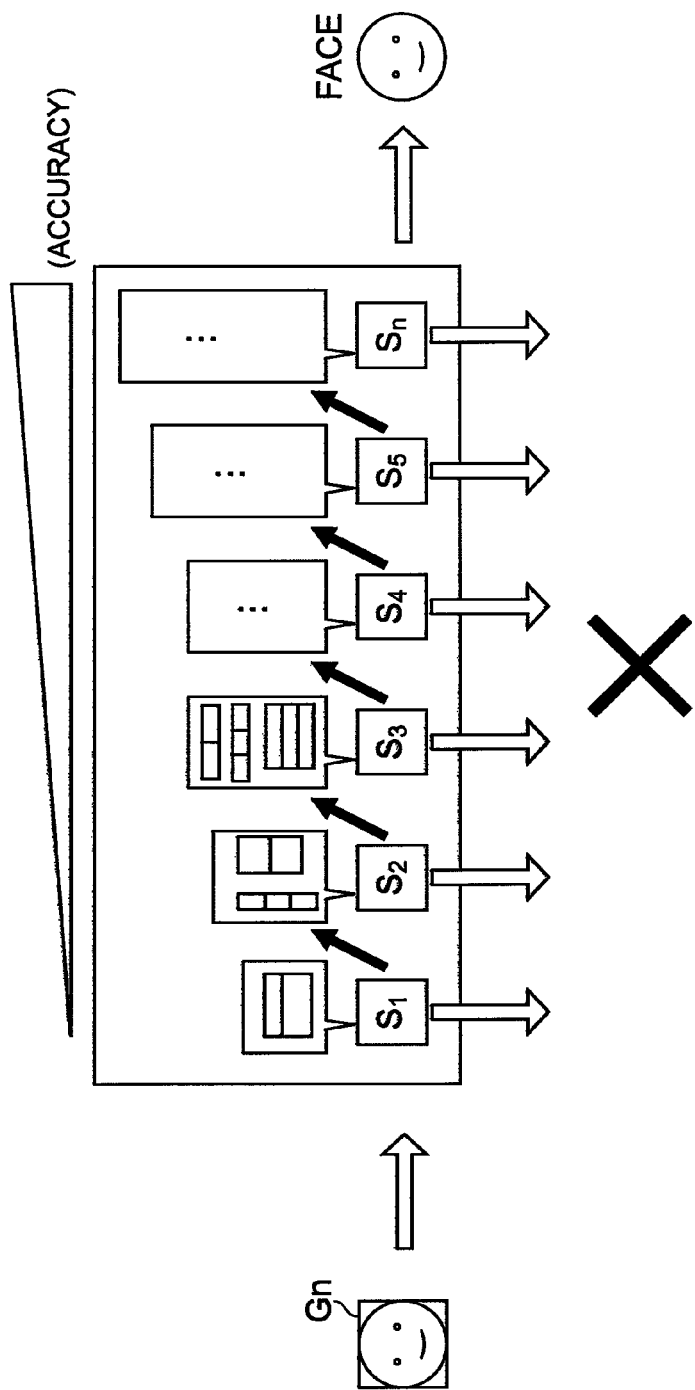
FIG. 7 is an outline diagram explaining a detection operation in an object detection apparatus of an aspect of the present invention.

As shown in FIG. 5, first, the determination image input unit 10 inputs a determination image (S10). FIG. 6 shows an example of the determination image F. Next, the image area dividing unit 11 generates an integral image of the determination image input in the processing of S10 (S12). Then, as shown in FIG. 6, the image area dividing unit 11 generates a plurality of sub-windows Gn by scanning the determination image F (S14). Next, the detector 2 selects one of the generated sub-windows Gn and performs face detection processing (S16). The outline of the processing in S16 is shown in FIG. 7. As shown in FIG. 7, the detector 2 causes $S_1$ to $S_n$ of the strong classifiers 21m to operate in an in-line manner in order of lower classification accuracy. $S_1$ to $S_n$ performs the processing for the same sub-window Gn. The detector 2 terminates the processing in each of the stages at the time when having determined that the sub-window Gn does not include a face and continues the processing when having determined that the window Gn includes the face. As shown by the arrow in the drawing, $S_2$ to $S_n$ determines whether the window includes the face or not by inputting a result of the previous stage. Then, the detector 2 determines that the face is captured in the sub-window Gn which has passed all the stages. The detector 2 performs the above processing for all the sub-windows Gn. When the processing of S16 is completed, the process goes to determination processing (S18).

In the processing of S18, the image synthesis unit 31 determines whether the face has been detected or not in the processing of S16. When determining that the face has been detected in the processing of S16, the image synthesis unit 31 generates a synthesis image in which the position of the sub-window is emphasized (S20). Then, the display unit 32 displays the synthesis image (S22). On the other hand, in the processing of S18, when the image synthesis unit 31 has determined that the face is not detected in the processing of S16, the determination image is displayed as it is (S22). When the processing of S22 has been completed, the control processing shown in FIG. 5 is terminated.

By performing the control processing shown in FIG. 5, the determination image F is input and divided to generate the sub-window Gn and it is determined whether the sub-window Gn displays or not the face in each of the stages on the basis of the result of the previous stage. In this manner, since the classification result of the previous stage is handed to the following stage, the following stage needs not evaluate the sub-window from scratch. Further, while the detection accuracy needs to be improved more in the latter stage, since the classification result of the previous stage is input, it is possible to improve the detection accuracy by adding the small number of rectangle features. Accordingly, it is possible to suppress the increase of processing time required in the latter stage.

Figure 8:
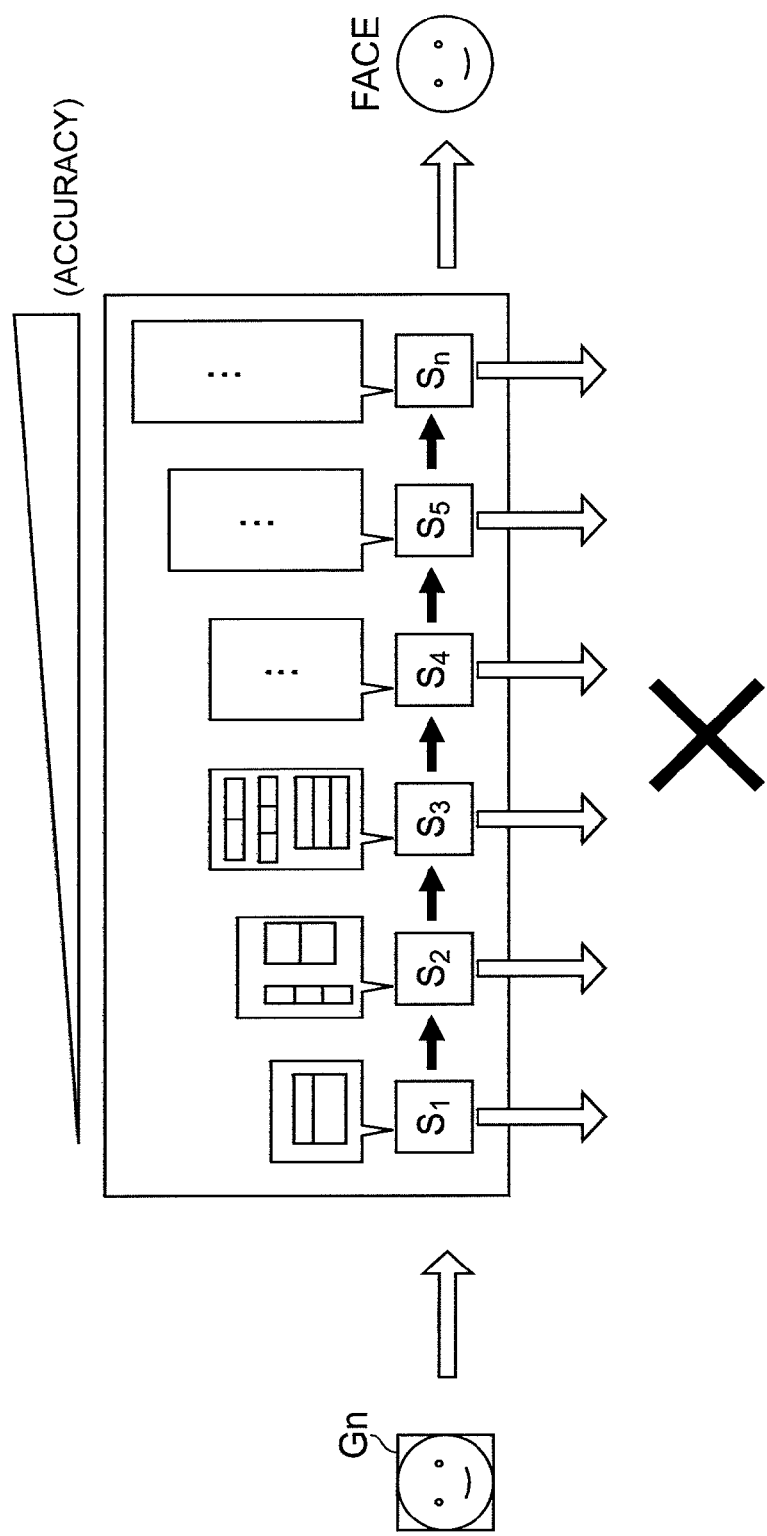
FIG. 8 is an outline diagram explaining a detection operation in a conventional object detection apparatus.

Here, a conventional technique will be explained by the use of FIG. 8 for explaining the function effect of the face detection apparatus 1 according to the present embodiment. As shown in FIG. 8, in a conventional face detection apparatus, a detector determining the sub-window Gn causes $S_1$ to $S_n$ of the strong classifiers to operate in a cascade manner in order of lower classification accuracy. In this conventional face detection apparatus, each of $S_1$ to $S_n$ functions independently and thereby the rectangle feature used in each stage becomes more complicated in the latter stage and as a result, the calculation processing amount in each stage also increases in the latter stage. Further, even when a sufficient result has been obtained up to a certain stage by the strong classifiers, since the result is rejected by one result of the following stages, there is a possibility that the detection accuracy is degraded.

On the other hand, in the face detection apparatus 1 according to the embodiment, the strong classifier 21m configuring the detector 2 inputs the classification result of the strong classifier 21m having lower classification accuracy than the aforementioned strong classifier 21m and determines whether the face 40 is captured in the determination image by the use of the input classification result. That is, in this face detection apparatus 1, each of the strong classifiers 21m does not determine the face 40 independently but each of the strong classifiers 21m determines the face 40 by utilizing the classification result of another strong classifier 21m. In this manner, since the strong classifier 21m can utilize the classification result of another strong classifier 21m, it is possible to reduce the number of estimation values of the weak classifiers 20n to be used by the strong classifier 21m compared to the case where each of the strong classifiers 21m determines the face 40 independently. Therefore, even when the detection accuracy of the strong classifier 21m configuring the detector 2 is configured so as to become higher gradually toward the end of the in-line connection, it is possible to obtain a higher processing speed in each of the strong classifiers 21m. Accordingly, it is possible to realize a higher speed as a result in the determination whether the face 40 is captured in the determination image. Further, each of the strong classifiers makes the determination by reflecting the results up to the previous stage and thereby can make the determination with the accumulated information. Accordingly, it is possible to improve the detection accuracy as a result.

Further, in the face detection apparatus 1 according to the embodiment, the detector 2 multiplies the input result of the weighted voting $S_{i-1}$ by the weight $W_{i-1}$ of the strong classifier 21m on the input side and can determine whether the face 40 is captured in the determination image or not by using the multiplied value. Therefore, the classification result of another strong classifier 21m can be reflected to the own classification and thereby it is possible to increase the classification accuracy in each of the strong classifiers 21m.

Note that the above-described embodiment shows an example of the object detection apparatus according to the present invention. The object detection apparatus according to the present invention is not limited to the object detection apparatus according to the embodiment and may be an apparatus which is modified from the object detection apparatus according to each of the embodiments or applied to another purpose within a range not changing the scope described in each of Claims.

For example, while the above-described embodiment explains an example of learning by using the AdaBoost algorithm, the present invention is not limited to this example. Further, while the above-described embodiment explains an example of applying the face detection apparatus 1 to the mobile terminal 3, the present invention is not limited to this example. Moreover, while the above described embodiment explains an example in which the object detection apparatus performs the detection processing by inputting an image from a camera 30, the input image of the object detection apparatus is not limited to this image. For example, the image may be an image obtained via communication or an image stored in a storage medium.

DESCRIPTION OF THE REFERENCE SYMBOLS

1: Object detection apparatus, 2: Detector, 20n: Weak classifier, 21m: Strong classifier

The invention claimed is:

1. An object detection apparatus that detects an object to be detected captured in a determination image according to a feature amount of the object to be detected preliminarily learned by use of a learning image, the object detection apparatus comprising:
a plurality of weak classifiers each calculating an estimation value indicating a possibility that the object to be detected is captured in the determination image according to the feature amount of the object to be detected;
a plurality of strong classifiers determining, with different levels of classification accuracy from one another, whether the object to be detected is captured or not in the determination image according to the plurality of feature amounts; and
a detector causing the plurality of strong classifiers to operate in order of lower classification accuracy, continuing processing when a first strong classifier among the plurality of strong classifiers has determined that the object to be detected is captured in the determination image, and determining that the object to be detected has not been detected without causing a second strong classifier among the plurality of strong classifiers having classification accuracy higher than the first strong classifier to operate, when the first strong classifier has determined that the object to be detected is not captured in the determination image, wherein
the first strong classifier inputs a classification result of a third strong classifier among the plurality of strong classifiers having classification accuracy lower than the first strong classifier and determines whether the object to be detected is captured or not in the determination image according to the plurality of estimation values and the input classification result,
wherein the first strong classifier inputs a result of weighted voting by using weight indicating a degree of ease of identification of each of first weak classifiers among the plurality of weak classifiers that are combined for the first strong classifier and the estimation value of each of the first weak classifiers, as the classification result of the third strong classifier, and
wherein each of the plurality of strong classifiers is provided with a weight according to the classification accuracy, and the first strong classifier multiplies the input result of the weighted voting by weight of the third strong classifier on an input side and determines whether the object to be detected is captured or not in the determination image by use of the multiplied value.

2. The object detection apparatus according to claim 1, wherein
the first strong classifier inputs the classification result of the third strong classifier having lower classification accuracy next to the first strong classifier.

3. The object detection apparatus according to claim 1, wherein
the first strong classifier determines whether the object to be detected is captured or not in the determination image according to a result of weighted voting by using a weight indicating a degree of ease of identification of each of first weak classifiers among the plurality of weak classifiers that are combined for the first strong classifier and the estimation value of each of the first weak classifiers, and according to the input classification result.

4. An object detection method of an object detection apparatus that is provided with a plurality of weak classifiers each calculating an estimation value indicating a possibility that an object to be detected is captured in a determination image according to a feature value of the object to be detected and a plurality of strong classifiers determining, with different levels of classification accuracy from one another, whether the object to be detected is captured or not in the determination image according to the plurality of estimation values, the object detection method comprising:
a carrying-out step of causing the plurality of strong classifiers, which are connected in series in order of lower classification accuracy, to carry out classification in the order of lower classification accuracy; and
a classification step of causing a first strong classifier among the plurality of strong classifiers to input a classification result of a third strong classifier among the plurality of strong classifiers having classification accuracy lower than the first strong classifier and to determine whether the object to be detected is captured or not in the determination image according to the plurality of estimation values and the input classification result, wherein
the carrying-out step is continued when the first strong classifier has determined that the object to be detected is captured in the determination image in the classification step, and the carrying-out step is interrupted when the first strong classifier has determined that the object to be detected is not captured in the determination image,
wherein the first strong classifier inputs a result of weighted voting by using weight indicating a degree of ease of identification of each of first weak classifiers among the plurality of weak classifiers that are combined for the first strong classifier and the estimation value of each of the first weak classifiers, as the classification result of the third strong classifier, in the classification step, and
wherein each of the plurality of strong classifiers is provided with a weight according to the classification accuracy, and the first strong classifier multiplies the input result of weighted voting by the weight of the third strong classifier on an input side and determines whether the object to be detected is captured or not in the determination image by use of the multiplied value, in the classification step.

5. The object detection method according to claim 4, wherein
the first strong classifier inputs the classification result of the third strong classifier having lower classification accuracy next to the first strong classifier, in the classification step.

6. The object detection method according to claim 4, wherein
the first strong classifier determines whether the object to be detected is captured or not in the determination image according to a result of weighted voting by using a weight indicating a degree of ease of identification of each of first weak classifiers among the plurality of weak classifiers that are combined for the first strong classifier and the estimation value of each of the first weak classifiers, and according to the input classification result, in the classification step.

* * * * *